US011347998B2

(12) United States Patent
Narcross

(10) Patent No.: US 11,347,998 B2
(45) Date of Patent: May 31, 2022

(54) NERVOUS SYSTEM ON A CHIP

(71) Applicant: Fredric William Narcross, Chillicothe, OH (US)

(72) Inventor: Fredric William Narcross, Chillicothe, OH (US)

( * ) Notice: Subject to any disclaimer, the term of this patent is extended or adjusted under 35 U.S.C. 154(b) by 1009 days.

(21) Appl. No.: 15/905,730

(22) Filed: Feb. 26, 2018

(65) Prior Publication Data

US 2019/0266477 A1    Aug. 29, 2019

(51) Int. Cl.
| G06F 30/00 | (2020.01) |
| G06N 3/063 | (2006.01) |
| G06F 8/40 | (2018.01) |
| G06F 30/323 | (2020.01) |
| G06F 30/34 | (2020.01) |

(52) U.S. Cl.
CPC ............. *G06N 3/063* (2013.01); *G06F 8/40* (2013.01); *G06F 30/323* (2020.01); *G06F 30/34* (2020.01)

(58) Field of Classification Search
CPC .............................. G06N 3/063; G06F 30/326
USPC .......................................................... 703/11
See application file for complete search history.

(56) References Cited

U.S. PATENT DOCUMENTS

| 2015/0106317 A1* | 4/2015 | Rangan | G06N 3/049 |
| | | | 706/44 |
| 2015/0120629 A1* | 4/2015 | Matsuoka | G06N 3/063 |
| | | | 706/25 |
| 2015/0248607 A1* | 9/2015 | Sarah | G06N 3/04 |
| | | | 706/25 |
| 2015/0317557 A1* | 11/2015 | Julian | G06N 3/049 |
| | | | 706/25 |

* cited by examiner

*Primary Examiner* — Suchin Parihar
(74) *Attorney, Agent, or Firm* — Michael D. Eisenberg

(57) ABSTRACT

A method to translate a nervous system model into Hardware Description Language (HDL) is presented here. The nervous system model is that produced from the Nervous System Modeling Tool, patent application Ser. No. 15/660,858, and the HDL translation downloads into either a Field Programmable Gate Array (FPGA) chip or an Application-Specific Integrated Circuit (ASIC) architecture. The method supports the neurobiological realism of Ser. No. 15/660,858 and adds massive parallelism operating at adjustable microchip speeds. A neurobiologically realistic nervous system embedded on a microchip achieves the goal of neuromorphic computing and thus embodies a nervous system on a chip. The potential applications are extensive and cover the range of robotics, big data analysis, medical diagnostics and remediation, self-learning systems, and artificially intelligent applications such as intelligent assistants. Intelligent assistants can be applied to the fields of language and technology exposition, the Internet of Things (IOT) and security.

8 Claims, 5 Drawing Sheets

NERVOUS SYSTEM ON A CHIP

CROSS-REFERENCES TO RELATED APPLICATIONS

U.S. application Ser. No. 14/821,738, entitled BRAIN EMULATOR SUPPORT SYSTEM, filed Aug. 8, 2015 and U.S. application Ser. No. 15/660,858, entitled NERVOUS SYSTEM MODELING TOOL, filed Jul. 26, 2017 are each hereby incorporated herein by reference in their respective entirety.

TECHNICAL FIELD

The subject technology is in the technical field of modeling nervous systems on microchip computing hardware and encompasses the field of neuromorphic computing.

BACKGROUND

The technology's background stems from earlier work in the fields of nervous system modeling and simulation at the macro and micro levels of biological realism on traditional computing devices. The tool presented here is the culmination of that research and further research on how to place the previous nervous system models directly onto hardware microchip devices or solid state media.

SUMMARY

The subject technology begins with the most comprehensive, detailed and accurate reproducer of nervous systems available in the public sector and permits it to operate at microchip speeds. It naturally integrates disparate input types and incorporates extensible hardware input and output units. It supports inexpensive delivery on reconfigurable FPGA hardware and has wide applicability into leading edge technologies and artificial intelligence applications.

In a variant, a method for modeling a nervous system on a chip, comprises, in a step (a): translating a nervous system model into Hardware Description Language (HDL) and in a step (b): translating runtime modules into HDL.

In another variant, the method comprises translating neuron records of step (a) into HDL.

In further variant, the method comprises translating astrocyte records of step (a) into HDL.

In yet another variant, the method comprises translating neuron runtime modules of step (b) into HDL.

In still a further variant, the method comprises converting floating-point arithmetic to fixed-point arithmetic.

In another variant, the method comprises translating astrocyte runtime modules of step (b) into HDL.

In a further variant, the method comprises the converting floating-point arithmetic to fixed-point arithmetic.

In yet another variant, a computer implemented method of simulating a nervous system on a solid state storage medium and a processor, comprises: a Nervous System to Hardware Description Language (HDL) Translator receiving the input from a Constructs Nervous System process. The Nervous System to HDL Translator translates the input into HDL code for an instantiated neuron and astrocyte modules' parameters in a High-Level Module HDL. The method comprises compiling by either a Create Output for Simulation process or by a Create Output for Hardware process. Nervous System HDL Runtime Modules are astrocyte and neuron runtime routines and translating them into HDL modules.

In still a further variant, the Nervous System to HDL Translator comprises: filtering neurons and astrocytes databases for dynamic values; and passing filtered values into either of a Build for Simulation module or Build for Hardware module.

In another variant, the Build for Simulation module comprises: a Build for Simulation I process; and a Build for Simulation II process.

In a further variant, the Build for Simulation I process comprises: a Create Simulation Header, comprising generating a timescale compiler directive to set a clocking frequency and timing resolution; processing Simulation PNS I, comprising reading all filtered Neurons; processing axon inputs and outputs; processing astrocytes inputs and outputs; and an Instantiate Astrocytes process, comprising constructing instantiated astrocyte modules within the Build for Simulation module.

In yet another variant, the Build for Simulation II process comprises: an Instantiate Neurons process, comprising constructing instantiated neuron modules within the Build for Simulation module for every neuron; a Create Simulation Begin process; a Process Simulation PNS II, comprising initializing PNS inputs and outputs to a default value; a Process Axons Initialization, comprising initializing layers of axon inputs per layer; and a Create Finish process.

In still a further variant, the Build for Hardware module comprises: a Build for Hardware I process; and a Build for Hardware II process.

In another variant, the Build for Hardware I process comprises: a Create Hardware Header, comprising generating a timescale compiler directive to set a clocking frequency and timing resolution; processing Hardware PNS I, comprising reading all filtered Neurons; processing axon inputs and outputs; processing astrocytes inputs and outputs; and an Instantiate Astrocytes process, comprising constructing instantiated astrocyte modules within the Build for Hardware module.

In a further variant, the Build for Hardware II process comprises: an Instantiate Neurons process, comprising constructing instantiated neuron modules within the Build for Hardware module for every neuron; a Create Hardware Begin process; a Process Axons Initialization, comprising initializing layers of axon inputs per layer; and a Create Finish process.

DETAILED DESCRIPTION OF THE DRAWINGS

Figure 1:
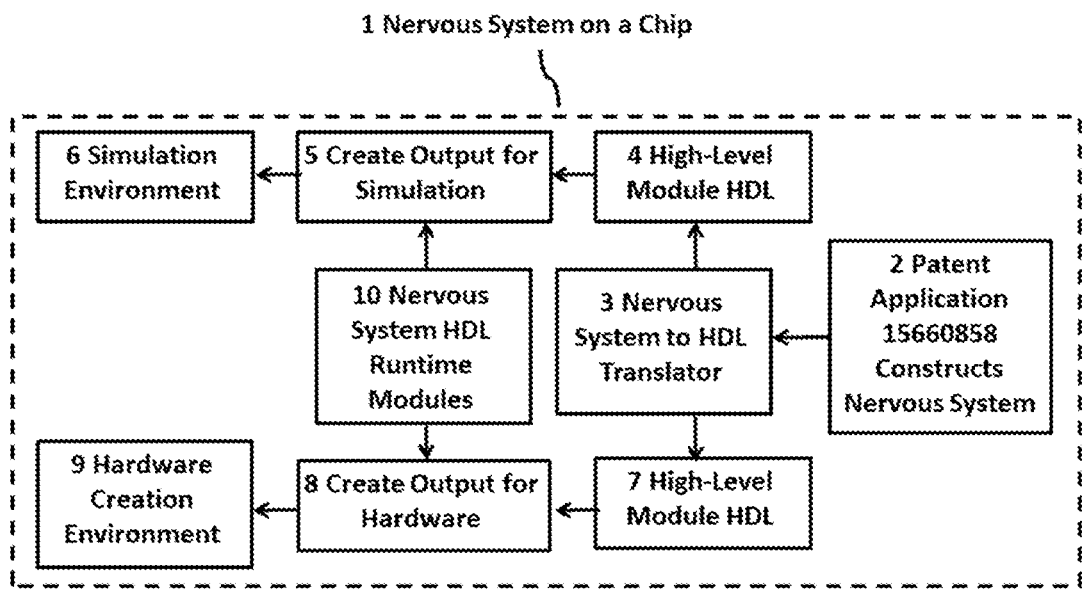
FIG. 1 illustrates 1 Nervous System on a Chip basic components, creation and operating environment.
Figure 10:
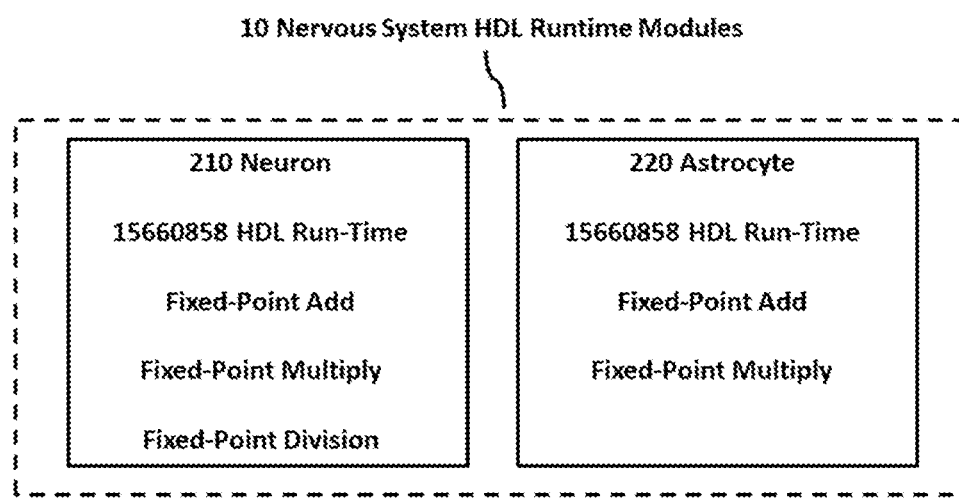
FIG. 10 illustrates further detail of 10 Nervous System HDL Runtime Modules.

FIG. 1 illustrates Nervous System on a Chip 1 basic components and construction processes. First, input is received from Constructs Nervous System 2 as disclosed in patent application Ser. No. 15/660,858. This input is further detailed in FIG. 2. The input from 2 is received by Nervous System to HDL Translator 3, which translates the input into HDL code for the instantiated neuron and astrocyte modules' parameters in either 4 High-Level Module HDL or 7 High-Level Module HDL. The difference between these two high-level HDL modules is that 4 is for when the user wants to simulate the resultant system in software without a delivery to hardware. Whereas, 7 is for delivery to either an FPGA or ASIC hardware device. This is further detailed in FIG. 3. Next, 10 Nervous System HDL Runtime Modules, whose components are detailed in FIG. 10, are the astrocyte and neuron runtime routines that were translated from the patent application Ser. No. 15/660,858 JAVA language versions into HDL modules. The modules of 10 and 7 and 4 are either compiled by 5 Create Output for Simulation when the user chooses to run a simulation as represented by 6 Simulation Environment or compiled by 8 Create Output for Hardware when the user chooses to create an FPGA or ASIC hardware device as represented by 9 Hardware Creation Environment.

Figure 2:
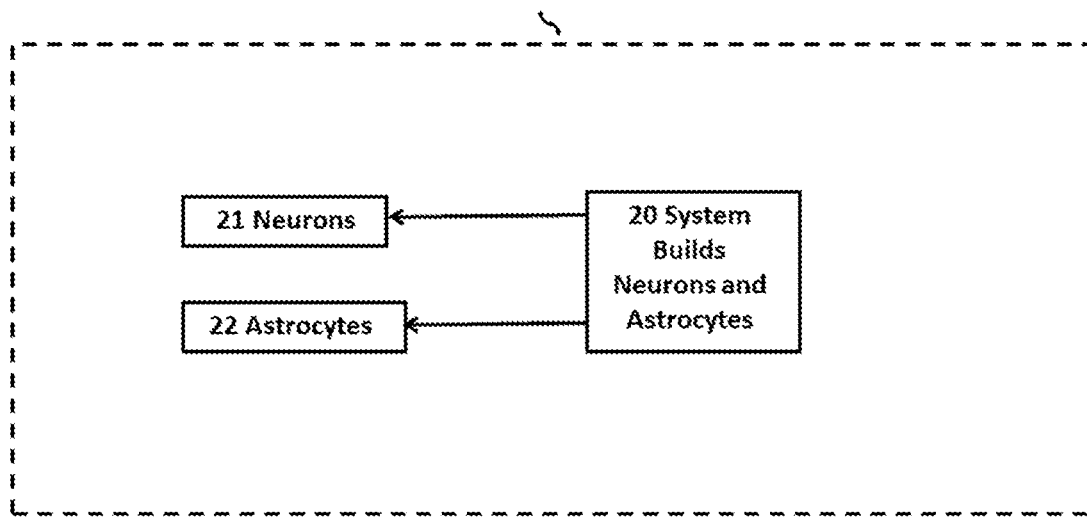
FIG. 2 illustrates further detail of Constructs Nervous System 2.

FIG. 2 illustrates detail of the Constructs Nervous System 2 process. 2 represents a basic goal of patent application Ser. No. 15/660,858 to build a database of connected neurons and a database of connected astrocytes. FIG. 2 consists of 20 System Builds Neurons and Astrocytes which is a basic representation of the patent application Ser. No. 15/660,858 processes which create both the 21 Neurons database as well as the 22 Astrocytes database.

Figure 3:
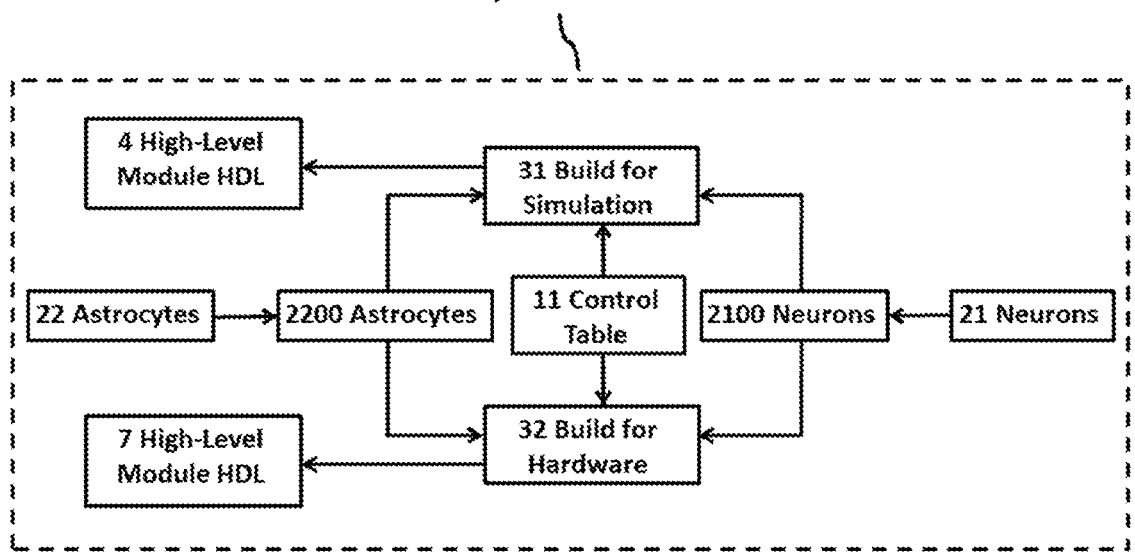
FIG. 3 illustrates further detail of Nervous System to HDL Translator 3.

FIG. 3 illustrates detail of 3 Nervous System to HDL Translator. The goal of 3 is first of all to examine both the 21 Neurons and the 22 Astrocytes databases for dynamic values, as determined by 2100 Neurons and 2200 Astrocytes respectively, which act as filters and pass those filtered values into either of 31 Build for Simulation or 32 Build for Hardware. The filtered values for 2100 are detailed in Tables 1-3.

TABLE 1

2100 Neurons

| Parameter | Description |
|---|---|
| 21001 Pa | Spiking Dynamics |
| 21002 Pb | Spiking Dynamics |
| 21003 PvPeakBD | Voltage Peak Basal Dendrite |
| 21004 PvPeakSoma | Voltage Peak Soma |
| 21005 PcBD | Conductance Basal Denedrites |
| 21006 PcSoma | Conductance Soma |
| 21007 Pc | Spiking Dynamics |
| 21008 Pd | Spiking Dynamics |
| 21009 Pe | Spiking Dynamics |
| 210010 Pf | Spiking Dynamics |
| 210011 Pg | Spiking Dynamics |
| 210012 Ph | Spiking Dynamics |
| 210013 Pi | Spiking Dynamics |
| 210014 Pj | Spiking Dynamics |

TABLE 2

2100 Neurons continued

| Parameter | Description |
|---|---|
| 210015 Pbd | Basal Dendrites Parameters |
| 2100151 Pbd | Basal Dendrites Parameters Layer 1 |
| 2100151A Pbdp | Short-term Synaptic Plasticity |
| 2100151A Pbdt | Short-term Synaptic Plasticity Recovery |

TABLE 2-continued

2100 Neurons continued

| Parameter | Description |
|---|---|
| 2100151A Pbdn | Number of Synapses |
| 2100151A PbdA | AMPA value |
| 2100151A PbdN | NMDA value |
| 2100151A PbdGA | GABA-A value |
| 2100151A PbdGB | GABA-B value |
| 2100151A PbdD | Dopamine value |
| 2100151A PbdS | Serotonin value |
| 2100151A Pbde | Excitatory |
| 2100151A Pbdd | Dummy - user defined |

TABLE 3

2100 Neurons continued

| Parameter | Description |
|---|---|
| 210015 Pbd | Basal Dendrites Parameters |
| 2100152 Pbd | Basal Dendrites Parameters Layer 2 |
| 2100152A Pbdp | Short-term Synaptic Plasticity |
| . | . |
| . | . |
| . | . |
| 2100153 Pbd | Basal Dendrites Parameters Layer 3 |
| 2100152A Pbdp | Short-term Synaptic Plasticity |
| . | . |
| . | . |
| . | . |
| 2100156 Pbd | Basal Dendrites Parameters Layer 6 |
| 2100156A Pbdp | Short-term Synaptic Plasticity |
| . | . |
| . | . |
| . | . |
| 2100156A Pbdd | Dummy - user defined |

The values from Table 1, 21001 through 210014, are extracted per neuron from 21 Neurons and applied as HDL module instantiation parameters in the high-level module for either 4 High-Level Module HDL or for 7 High-Level Module HDL. The module instantiation parameters are constructed by either 31 Build for Simulation or 32 Build for Hardware respectively. For each neuron module instantiated within a high-level module, 4 or 7, there is only one copy of these parameters, which basically represent neuron soma parameters or apical dendrite parameters common to all apical dendrites for this neuron. On the other hand, Tables 2 and 3 represent a collection of 96 permutations of the basal dendrites that 1 Nervous System on a Chip supports. This includes 6 possible layers of apical dendrites with 16 possible basal dendrites per layer. Table 2 lists the entire entries for the first layer and first basal dendrite. Table 3 lists the repetitions for the remainder of the 6 layers as well a shortened form for the 16 basal dendrites. The filtered values for 2200 are detailed in Table 4.

TABLE 4

2200 Astrocytes

| Parameter | Description |
|---|---|
| 22001 Nn | Neuron Neighbor 1 ID |
| 22002 Nn | Neuron Neighbor 2 ID |
| 22003 Nn | Neuron Neighbor 3 ID |
| 22004 Nn | Neuron Neighbor 4 ID |
| 22005 An | Astrocyte Neighbor 1 ID |
| 22006 An | Astrocyte Neighbor 2 ID |

TABLE 4-continued

2200 Astrocytes

| Parameter | Description |
| --- | --- |
| 22007 An | Astrocyte Neighbor 3 ID |
| 22008 An | Astrocyte Neighbor 4 ID |

Parameters 2201 Nn through 2204 Nn are the neuron ids of those neurons surrounded by some particular astrocyte. The neurons' synaptic activity or lack thereof is recognized by the astrocyte, which in turn increases or decreases the surrounding capillaries diameter that in turn changes the volume of blood flow through the capillaries. The capillaries blood flow provide a range of resources required for basal dendrite growth or pruning which places astrocytes in the position of managing this change by dynamically adjusting blood flow. This is the model of the tripartite synapse also known as the Neural Vascular Unit (NVU). Parameters 2205 An through 2208 An are the astrocyte ids of the local astrocytes connected by gap junctions to this particular astrocyte. This supports the creation of an astrocyte network, which in turn provides for one astrocyte's activity to be communicated to its neighbors and vice versa. The thinking behind why astrocyte networks are an advantage to nervous systems is that the communication of neuronal activity or the lack thereof provides advanced "knowledge" of neuronal activity which can modify capillary resources so as to minimize the lag time of neuronal resource supply and demand. This minimization of lag time to increase capillary resources or its opposite to minimize the total local blood supply when there is no demand are both considered to be the result of evolutionary blood flow optimization. The brain of humans, which account for about 2% of total body mass but which account for 20% of blood borne oxygen and glucose consumption benefits greatly from neurophysiological optimization of resource consumption by astrocytes. Finally, 11 Control Table is a 2 patent application Ser. No. 15/660,858 JAVA class which must be customized by the user for use by 1.

11 contains parameter 1101 SB which controls whether 31 or 32 is invoked. Parameter 1102 contains the text name of the high-level module's Start name input port line, which is the name of the line that initializes or reinitializes the entire system including all of the instantiated neurons and astrocytes. Parameter 1103 contains the text name of the high-level module's Clock name input port line, which is the name of the line that is passed to all instantiated neuron and astrocyte modules to control their clock signal and, in turn, the frequency of all module operations. Parameter 1104 Neuron Size contains the number of 21 records to inspect. This allows the user to select a subset of neurons generated by 2 as opposed to the entire collection. Parameter 1105 Astrocyte Size contains the number of 22 records to inspect. This allows the user to select a subset of astrocytes generated by 2 as opposed to the entire collection. Parameter 1106I 1 InType1 indicates the neuron type of the peripheral nervous system that will be delivered from external sources, i.e. from sources external to the microchip. This value is then searched for within 21 and each occurrence is assigned a new input port line with a name given by parameter 1106I 1 InName1. Parameter 1107O 1 OutType1 indicates the neuron type of the peripheral nervous system that will be delivered to external sources, i.e. to sources external to the microchip. This value is then searched for within 21 and each occurrence is assigned a new output port line with a name given by parameter 1107O 1 OutName1.

Figure 4:
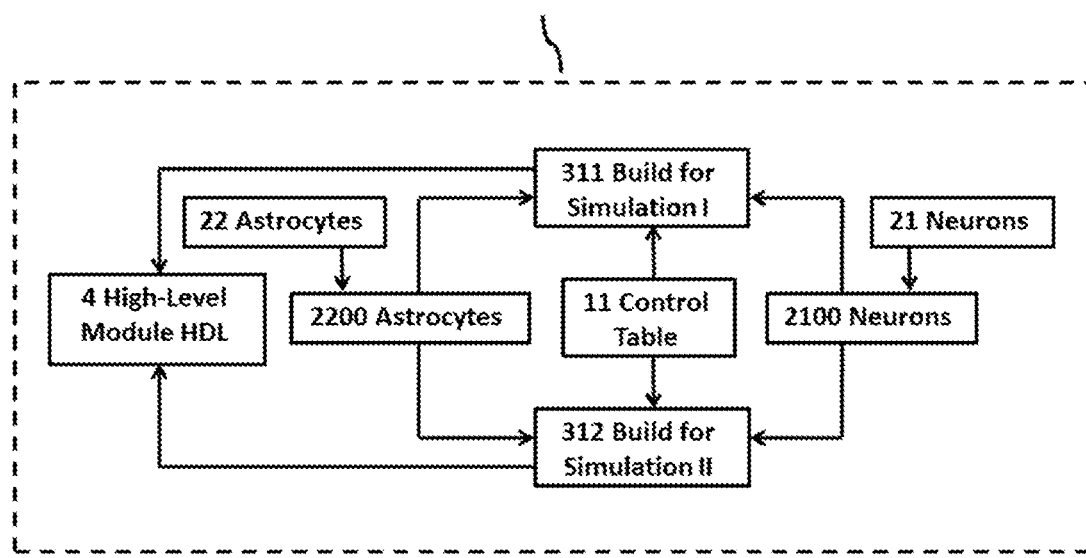
FIG. 4 illustrates further detail of Build for Simulation 31.

FIG. 4 illustrates detail of 31 Build for Simulation. This process creates 4 High-Level Module HDL which is the high level HDL module to generate when the user wants to construct a simulation and verify their design prior to creating a high-level module for chip construction either in FPGA or ASIC form. 31 begins with 311 Build for Simulation I, which is the first half of the processes which create 4. 311 is detailed in FIG. 5. 31 continues with 312 Build for Simulation II, which is the second half of the processes which create 4. 312 is detailed in FIG. 6. Both of 311 and 312 utilize input from 21 and 22 filtered through 2100 and 2200 respectively and detailed further in FIG. 3. The information gathered and filtered is used to create the instantiated modules' parameters for 4. Also, both 311 and 312 utilize 11 so as to distinguish which neurons from 21 might be either PNS input or PNS output. This was also described in the details of FIG. 3. As well, 11 is used to invoke 31 rather than invoking 32 Build for Hardware. This was also described in FIG. 3.

Figure 5:
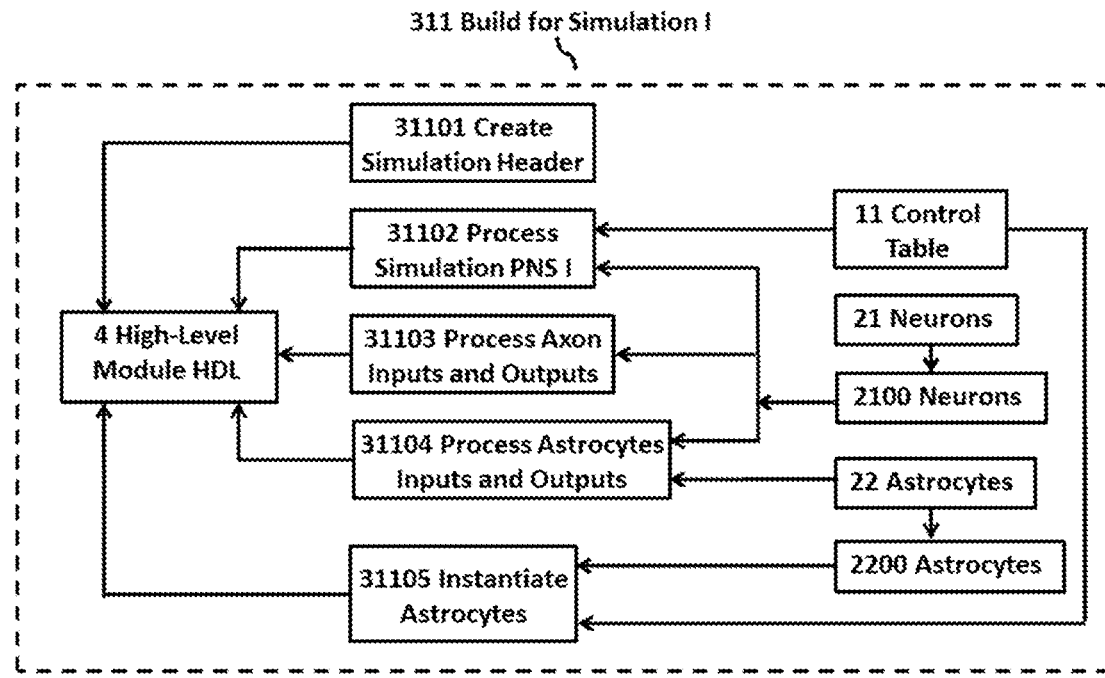
FIG. 5 illustrates further detail of 311 Build for Simulation I.

FIG. 5 illustrates detail of 311 Build for Simulation I. 311 begins with 31101 Create Simulation Header, which creates the "'timescale" compiler directive to set the clocking frequency and timing resolution. This is set to a default of 100 ns with a 1 ps resolution. 31101 also sets 4's name to a default of "test_bench". Next, 311 invokes 31102 Process Simulation PNS I. 31102 reads all of the 21 Neurons filtered through 2100 looking for both PNS inputs from 11 parameter 1106I 1 InType1 as well as PNS outputs from 1107O 1 OutType1. Matching inputs receive a name of 11 parameter 1106I 1 InName1 followed by an integer which is incremented for each occurrence. For example, the first such occurrence would receive a name of in1Name_0 and the second would receive a name of in1Name_1. Matching outputs receive a name of 11 parameter 1107O 1 OutName1 followed by an integer which is incremented for each occurrence. For example, the first such occurrence would receive a name of out1Name_0 and the second would receive a name of out1Name_1, etc. All PNS inputs and outputs are declared as one bit registers: "reg". Next, 311 invokes 31103 Process Axon Inputs and Outputs. First of all, for each neuron contained in 21, 31103 sets up a maximum of 6 apical dendrite inputs each of which accept a maximum of 16 axon inputs. For example, for neuron id 0 there would be 6, 16 bit registers declared as reg [15:0] axon_0_in_1 for layer I up to reg [15:0] axon_0_in_6 for layer VI. Then 31103 sets up a single axon output per neuron id from 21. For example, for neuron id 0 the declaration would become "wire axon_0". The neurons' axons are all declared with a "wire" designation since they interconnect modules. Next, 311 invokes 31104 Process Astrocytes Inputs and Outputs. First of all, for each astrocyte contained in 22, 31104 sets up a wire output with a text name of "astro_out_id" where id is replaced by the astrocyte id. This output is used to communicate to connected astrocytes. Then for each astrocyte contained in 22, 31104 sets up a wire output with a text name of "arteriole_out_id" where id is replaced by the astrocyte id. This output is used to communicate to connected neurons. Next, 311 invokes 31105 Instantiate Astrocytes, which constructs the instantiated astrocyte modules within 4. To accomplish this, 31105 creates a unique module header for each astrocyte consisting of the text "astrocyte", which is the name of the astrocyte module, followed by the text "A_ID_id" where "id" is the astrocyte id number. For example, "A_ID_0" would be the astrocyte module instantiation for the astrocyte with id 0. Next, as required by HDL syntax, a "{" is inserted. Next, the port list for this astrocyte is elaborated. The list begins with the text for the astrocyte module's neurons' surrounded: ".neuron_in({". This is then followed by the list of neurons' surrounded which appear from 2200's parameters 22001 through 22004, and then concatenated to a generic axon output text. For example, "axon_0" is the generic axon output for neuron id 0. This is repeated for each neuron surrounded by this particular astrocyte. A complete example might look like: ".neuron_in ({axon_0, axon_1, axon_2, axon_3}),". Next, the text for the astrocyte module's astrocytes' connected ports is inserted: "astrocyte_in({". This is then followed by the list of astrocytes connected to which appears from 2200's parameters 22005 through 22008, and then concatenated to a generic astrocyte input text. For example, "astro_out_0" is the generic input from astrocyte id 0. This is repeated for each astrocyte connected to by this particular astrocyte. A complete example might look like: ".astrocyte_in ({astro_out_1, astro_out_2, astro_out_3, astro_out_4}),". Next, the text for the clock parameter is inserted into the module instantiation. This is a universal setting from 11, parameter 1103 Clock, and looks like, ".clock (clock_50)," for example when the clock parameter has been set to "clock_50". Next, the text for the start parameter is inserted into the module instantiation. This is a universal setting from 11, parameter 1102 Start, and looks like, ".start (start)," when the start parameter has been set to "start". Next, the output for this particular astrocyte, which communicates to astrocyte neighbors is inserted, for example ".astro_out (astro_out_1)," for astrocyte id 1. Finally, the arteriole output for this astrocyte is set, for example ".arteriole_out (arteriole_out_1)". The arteriole output is the parameter which opens and closes the surrounded neurons' capillary blood supply.

Figure 6:
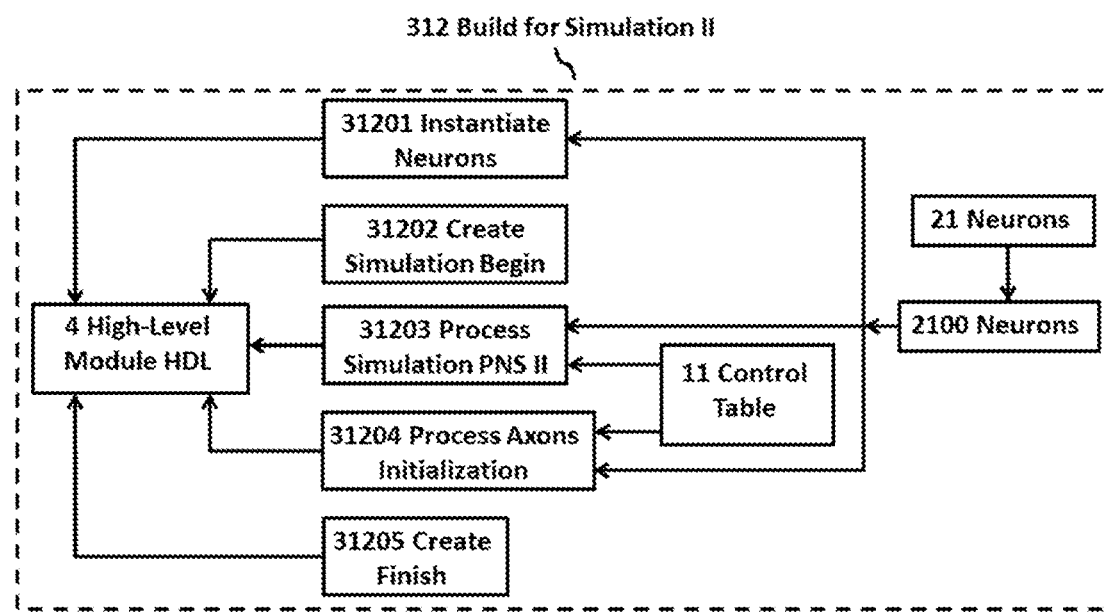
FIG. 6 illustrates further detail of 312 Build for Simulation II.

FIG. 6 illustrates detail of 312 Build for Simulation II. This is the continuation of 311 from FIG. 5. 312 begins with 31201 Instantiate Neurons, which constructs the instantiated neuron modules within 4 for every neuron in 21. To accomplish this, 31201 creates a header for the neuron parameters used by every neuron module: "neuron # (". This is a requirement of the HDL language when instantiated modules have parameters to be overridden as is the case with 1 Nervous System on a Chip. "neuron" is the name of the HDL neuron module. Next and for each neuron instantiated, the parameter values from TABLE 1 2100 Neurons are extracted and translated into 16 bit values. For parameter 21001 Pa for example, the following text would be constructed and added to 4 for this neuron: "16'b0000000000000011, //Pa". Here, the original value of parameter Pa in some neuron has a value of 3 in decimal or 11 in binary. Each parameter is left filled with zeros to create 16 total bits as is expected for the HDL neuron modules. The text "//Pa" is a comment for the user indicating that this is the Pa parameter's value. Next, the parameter values from TABLE 2 2100 are extracted and converted to hexadecimal values and concatenated into a single line of code. This is repeated for every basal dendrite, up to a maximum of 16 basal dendrites per layer, and is repeated for up to a maximum of 6 layers. For example, the following might be generated for some neuron for its layer III basal dendrite number 1: "80'h26660096000411220010, //Pin3_1_ptnANGGDSed". The interpretation here is that 80 bits are being represented as hexadecimal digits beginning with parameter 2100151A Pbdp and concluding with parameter 2100151A Pbdd. The first 3 parameters, 2100151A Pbdp to 2100151A Pbdn are 4 hexadecimal digits in length and the final 8 parameters, 2100151A PbdA to 2100151A Pbdd are single digit hexadecimal numbers, i.e. each parameter is four bits in length and represented as a single hexadecimal number. This process is continued for all parameters as represented in 2100 TABLE 3. When all of the parameters are added then 31201 continues by adding the port list for this particular neuron. To accomplish this 31201 creates a unique module header name for each neuron consisting of the text "N_ID_id" where "id" is the neuron id number. For example, "N_ID_0" would be the neuron module instantiation for the neuron with id 0. Next, as required by HDL syntax a "(" is inserted. Next, the port list for this neuron is elaborated. This begins with the text for the 16 neurons axon inputs for each apical dendrite. These 16 inputs are concatenated as a single 16 bit register with a naming convention of axon_id_in_layer#. the register's name is surrounded by "( )" and preceded by the neuron module's axon input text per layer, ".axon_in_layer#". "id" is the neuron's id and "layer#" is the apical dendrite layer. For example, ".axon_in_1 (axon_0_in_1)," would indicate neuron id 0's layer I 16 bit register. This is repeated for all 6 layers, where each apical dendrite resides. Next, the text for the clock parameter is inserted into the module instantiation. This is a universal setting from 11, parameter 1103 Clock, and looks like, ".clock (clock_50)," for example when the clock parameter has been set to "clock_50". Next, the text for the start parameter is inserted into the module instantiation. This is a universal setting from 11, parameter 1102 Start, and looks like, ".start (start)," when the start parameter has been set to "start". Next, the arteriole input managed by the astrocyte, which surrounds this particular neuron, is inserted. This takes the form of ".arteriole_in (arteriole_out_0)," where the "out_0" indicates the arteriole managed by astrocyte id 0. Finally, the axon output for this particular neuron is elaborated. This takes the form of: ".axon (axon_1));" where "_1" indicates neuron id 0 and the additional ");" is the HDL convention to end the port assignments. Next, 31202 Create Simulation Begin is invoked. 31202 adds the HDL text "initial" on one line followed by the text "begin" on the next line. Next, 31203 Process Simulation PNS II is invoked to initialize the PNS inputs and outputs to a default value of 0. Since these are all single bit values, input values are initialized to "1'b0", for example "in1Name_0=1'b0;" would set the first PNS input value to 0. For PNS output, the axon from the neuron providing the output would be connected to an output PNS name, for example "out1Name_0=axon_3;" would connect the first PNS output signal to the value from neuron id 3's axon. Next, 31204 Process Axons Initialization is invoked to initialize the 6 potential layers of up to 16 axon inputs per layer. This requires every neuron from 21 to be filtered through 2100 Neurons looking for the neuron's axon inputs per layer or the PNS inputs per layer. These results per layer are concatenated together according to HDL syntax and if any layer's axon inputs do not exist then they are replaced with single bits of zeros. For example, "axon_3_in_3={axon_0, axon_1, axon_2, 1'b0, 1'b0, 1'b0, 1'b0, 1'b0, 1'b0, 1'b0, 1'b0, 1'b0, 1'b0, 1'b0, 1'b0, 1'b0};" would initialize neuron 3's layer 3 with axon inputs from neuron id 0, neuron id 1 and neuron id 2 and the rest of the inputs are non-existent and take on default values of 0. In case a neuron's inputs come from a PNS input resource then the input name follows the PNS input naming convention for the input in question. For example, "axon_4_in_4={in1Name_0, 1'b0, 1'b0, 1'b0, 1'b0, 1'b0, 1'b0, 1'b0, 1'b0, 1'b0, 1'b0, 1'b0, 1'b0, 1'b0, 1'b0, 1'b0};" would indicate that neuron id 4's layer 4 has a single input from PNS input "in1Name_0". Finally, 312 invokes 31205 Create Finish to add the text "end" followed by the text "endmodule" and that completes 4. However, if the user wants to create the simulation by providing specific axon input values over some extended repeated number of cycles then the user must modify 4's code between the "begin" and "end" text. This would typically be in the form of a loop within which specific axons are initialized to specific values all of which must be customized according to user requirements.

Figure 7:
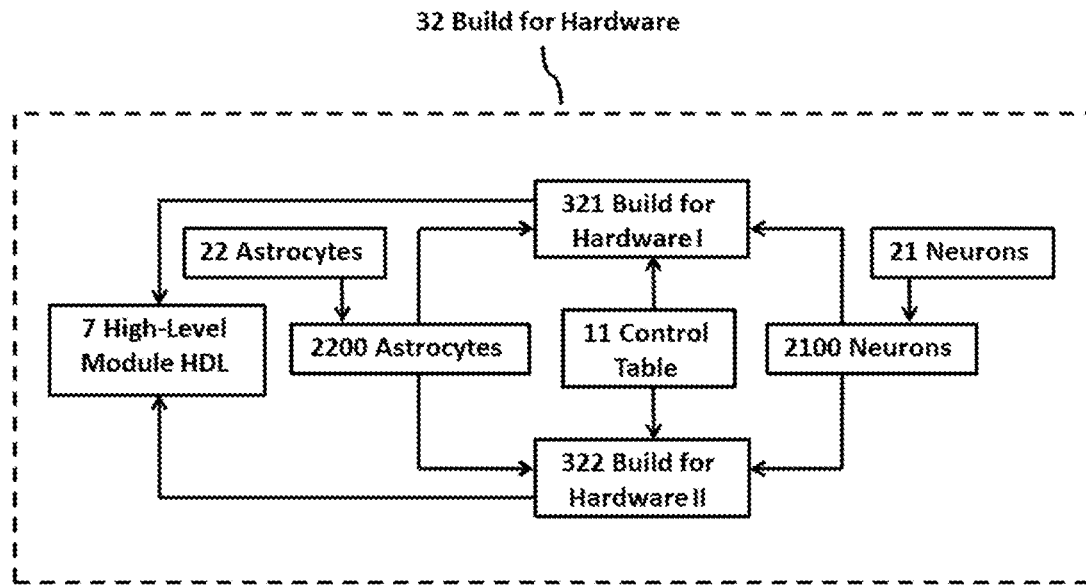
FIG. 7 illustrates further detail of 32 Build for Hardware.
Figure 8:
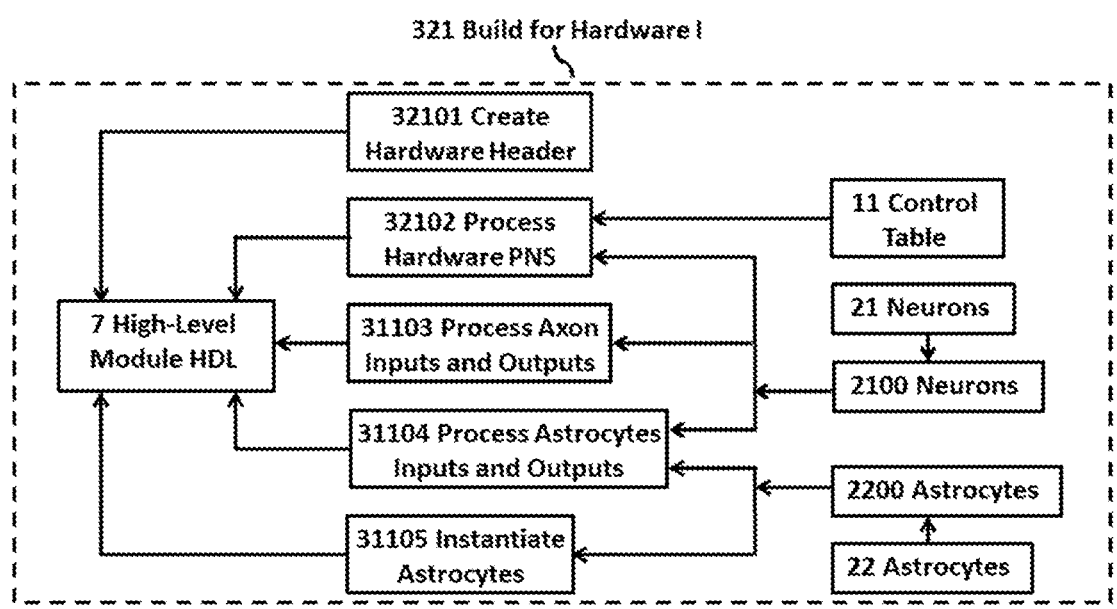
FIG. 8 illustrates further detail of 321 Build for Hardware I.
Figure 9:
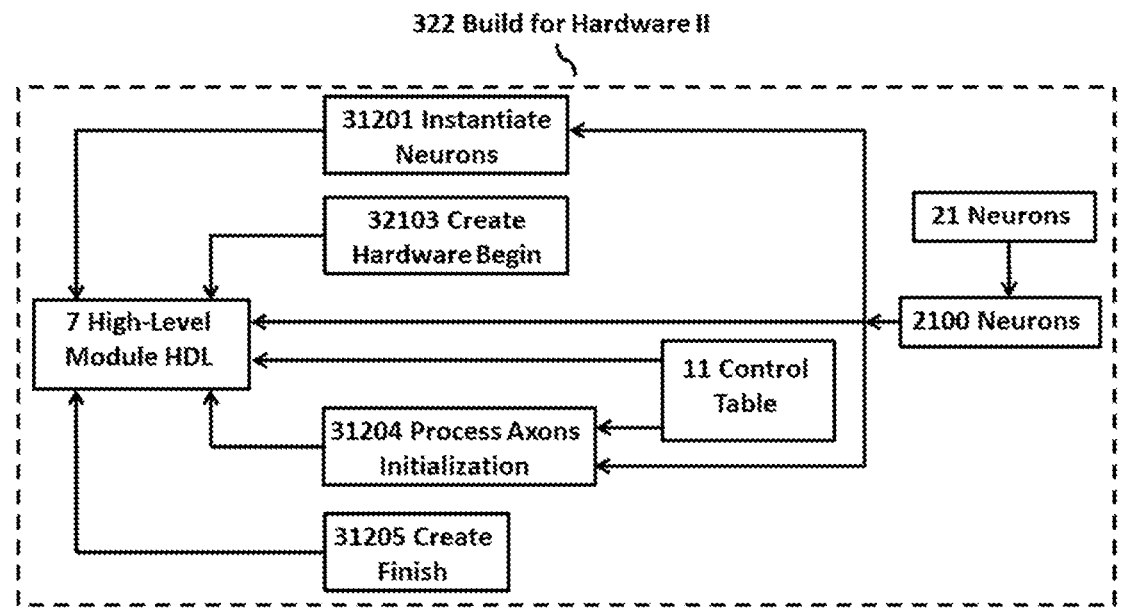
FIG. 9 illustrates further detail of 322 Build for Hardware II.

FIG. 7 illustrates detail of 32 Build for Hardware. 32 builds the 7 High-Level Module HDL, which is the output for a high-level module destined for elaboration into an FPGA or ASIC device. 32 begins with 321 Build for Hardware I, which is the first half of the processes which create 7. 321 is detailed in FIG. 8. 32 continues with 322 Build for Hardware II, which is the second half of the processes which create 7. 322 is detailed in FIG. 9. Both of 321 and 322 utilize input from 21 and 22 filtered through 2100 and 2200 respectively and detailed in FIG. 3. The information gathered and filtered is used to create the instantiated modules' parameters for 7. Also, both 321 and 322 utilize 11 so as to distinguish which neurons from 21 might be either PNS input or PNS output. This was described in the details of FIG. 3. As well, 11 is used to invoke 32 rather than invoking 31 Build for Simulation. This was also described in FIG. 3.

FIG. 8 illustrates detail of 321 Build for Hardware I. 321 begins with 32101 Create Hardware Header, which creates the "timescale" compiler directive to set the clocking frequency and timing resolution. This is set to 100 ns with a 1 ps resolution. 32101 also sets 7's name to a default of "BESS3_syn". Next, 321 sets up the high-level module's header which must be synthesizable, i.e. a module header following HDL hardware device conventions. To accomplish this 32101 sets up the port list for 7. This is synergistic to the actual port names which the hardware device will use and requires the user to follow up these definitions with those set up for the hardware device. First of all, a start/reset input port must be named and this defaults to "start". Next, a clock input port must be named and this defaults to "clock". Thus far the output from 32101 looks like "module BESS3_syn (input start, input clock," using the above assumptions. Next, 321 invokes 32102 Process Hardware PNS to continue the module header. 32102 reads all of the 21 Neurons filtered through 2100 looking for both PNS inputs from 11 parameter 1106I 1 InType1 as well as PNS outputs from 1107O 1 OutType1. Matching inputs receive a name of 11 parameter 1106I 1 InName1 followed by an integer which is incremented for each occurrence. For example, the first such occurrence would receive a name like inidName_0 and the second would receive a name like inidName_1, where the "id" indicates the neuron id. These names must be preceded with a port designation of "input", for example "input in1Name_0," names the high-level module's input port named "in1Name_0," as the first PNS input port for the neuron whose id is 1. The second PNS input port for the neuron whose id is 1 would be named "in1Name_1,". This process is continued for matching PNS outputs, which receive the name of the PNS neuron's axon. For example, if neuron id 3 was designated as a PNS output neuron then the port designation would be "output axon_3". The port designations are terminated with a ");". Next, 321 invokes 31103 Process Axon Inputs and Outputs. First of all, for each neuron contained in 21, 31103 sets up a maximum of 6 apical dendrite inputs each of which accept a maximum of 16 axon inputs. For example, for neuron id 0 there would be 6, 16 bit registers declared as reg [15:0] axon_0_in_1 for layer I up to reg [15:0] axon_0_in_6 for layer VI. Then 31103 sets up a single axon output per neuron id from 21. For example, for neuron id 0 the declaration would become "wire axon_0". The neurons' axons are all declared with a "wire" designation since they interconnect modules. Next, 321 invokes 31104 Process Astrocytes Inputs and Outputs. First of all, for each astrocyte contained in 22, 31104 sets up a wire output with a text name of "astro_out_id" where id is replaced by the astrocyte id. This output is used to communicate to connected astrocytes. Then for each astrocyte contained in 22, 31104 sets up a wire output with a text name of "arteriole_out_id" where id is replaced by the astrocyte id. This output is used to communicate to connected neurons. Next, 321 invokes 31105 Instantiate Astrocytes, which constructs the instantiated astrocyte modules within 7. To accomplish this, 31105 creates a unique module header for each astrocyte consisting of the text "astrocyte", which is the name of the astrocyte module, followed by the text "A_ID_id" where "id" is the astrocyte id number. For example, "A_ID_0" would be the astrocyte module instantiation for the astrocyte with id 0. Next, as required by HDL syntax, a "{" is inserted. Next, the port list for this astrocyte is elaborated. This begins with the text for the astrocyte module's neurons' surrounded: ".neuron_in ({". This is then followed by the list of neurons' surrounded which appear from 2200's parameters 22001 through 22004, and then concatenated to a generic axon output text. For example, "axon_0" is the generic axon output for neuron id 0. This is repeated for each neuron surrounded by this particular astrocyte. A complete example might look like: ".neuron in ({axon_0, axon_1, axon_2, axon_3}),". Next, the text for the astrocyte module's astrocytes' connected ports is inserted: "astrocyte_in ({". This is then followed by the list of astrocytes connected to which appears from 2200's parameters 22005 through 22008, and then concatenated to a generic astrocyte input text. For example, "astro_out_0" is the generic input from astrocyte id 0. This is repeated for each astrocyte connected to this particular astrocyte. A complete example might look like: ".astrocyte_in ({astro_out_1, astro_out_2, astro_out_3, astro_out_4}),". Next, the text for the clock parameter is inserted into the module instantiation. This is a universal setting from 11, parameter 1103 Clock, and looks like, ".clock (clock_50)," for example when the clock parameter has been set as "clock_50". Next, the text for the start parameter is inserted into the module instantiation. This is a universal setting from 11, parameter 1102 Start, and looks like, ".start (start)," when the start parameter has been set as "start". Next, the output for this particular astrocyte, which communicates to astrocyte neighbors is inserted, for example ".astro_out (astro_out_1)," for astrocyte id 1. Finally, the arteriole output for this astrocyte is set, for example ".arteriole_out (arteriole_out_1)". FIG. 9 illustrates detail of 322 Build for Hardware II. This is the continuation of 321 from FIG. 8. 322 begins with 31201 Instantiate Neurons, which constructs the instantiated neuron modules within 7 for every neuron in 21. To accomplish this, 31201 creates a header for the neuron parameters used by every neuron module: "neuron # (". This is a requirement of the HDL language when instantiated modules have parameters to be overridden as is the case with 1 Nervous System on a Chip. "neuron" is the name of the HDL neuron module. Next and for each neuron instantiated, the parameter values from TABLE 1 2100 Neurons are extracted and translated into 16 bit values. For example, for parameter 21001 Pa, the following text would be constructed and added to 4 for this neuron: "16b0000000000000011, //Pa". Here, the original value of parameter Pa in some neuron has a value of 3 in decimal or 11 in binary. Each parameter is left filled with zeros to create 16 total bits as is expected for the HDL neuron modules. The text "//Pa" is a comment for the user indicating that this is the Pa parameter's value. Next, the parameter values from TABLE 2, 2100 are extracted and converted to hexadecimal values and concatenated into a single line of code. This is repeated for every basal dendrite per layer up to a maximum of 16 and repeated again for up to a maximum of 6 layers. For example, the following might be generated for some neuron for its layer III basal dendrite number 1: "80'h26660096000411220010, //Pin3_1_ptnANGGDSed". The interpretation here is that 80 bits are being represented as hexadecimal digits beginning with parameter 2100151A Pbdp and concluding with parameter 2100151A Pbdd. The first 3 parameters, 2100151A Pbdp to 2100151A Pbdn are 4 hexadecimal digits in length and the final 8 parameters, 2100151A PbdA to 2100151A Pbdd are single digit hexadecimal numbers, i.e. each parameter is four bits in length and represented as a single hexadecimal number. This process is continued for all parameters as represented in 2100 TABLE 3. When all of the parameters are added then 31201 continues by adding the port list for this particular neuron. To accomplish this 131201 creates a unique module header name for each neuron consisting of the text "N_ID_id" where "id" is the neuron id number. For example, "N_ID_0" would be the neuron module instantiation for the neuron with id 0. Next, as required by HDL syntax, a "(" is inserted. Next, the port list for this neuron is elaborated. This begins with the text for the 16 neurons axon inputs for each apical dendrite. These 16 inputs are concatenated as a single 16 bit register with a naming convention of axon_id_in_layer#. The register's name is surrounded by "( )" and preceded by the neuron module's axon input text per layer, ".axon_in_ layer#". "id" is the neuron's id and "layer#" is the apical dendrite layer. For example, ".axon_in_1 (axon_0_in_1)," would indicate neuron id 0's layer I 16 bit register. This is repeated for all 6 layers, where each apical dendrite resides. Next, the text for the clock parameter is inserted into the module instantiation. This is a universal setting from 11, parameter 1103 Clock, and looks like, ".clock (clock_50)," for example when the clock parameter has been set as "clock_50". Next, the text for the start parameter is inserted into the module instantiation. This is a universal setting from 11, parameter 1102 Start, and looks like, ".start (start)," when the start parameter has been set as "start". Next, the arteriole input managed by the astrocyte, which surrounds this particular neuron, is inserted. This takes the form of ".arteriole_in (arteriole_out_0)," where the "out_0" indicates the arteriole managed by astrocyte id 0. Finally, the axon output for this particular neuron is elaborated. This takes the form of: ".axon (axon_1));" where "_1" indicates neuron id 0 and the additional ");" is the HDL convention to end the port assignments. Next, 32103 Create Hardware Begin is invoked to add the HDL text "initial" on one line followed by the text "begin" line. Next, 31204 Process Axons Initialization is invoked to initialize the 6 potential layers of up to 16 axon inputs per layer. This requires every neuron from 21 to be filtered through 2100 Neurons looking for the neuron's axon inputs per layer or the PNS inputs per layer. These results per layer are concatenated together according to HDL syntax and if any layer's axon inputs do not exist then they are replaced with single bits of zeros. For example, "axon_3_in_3={axon_0, axon_1, axon_2, 1'b0, 1'b0, 1'b0, 1'b0, 1'b0, 1'b0, 1'b0, 1'b0, 1'b0, 1'b0, 1'b0, 1'b0};" would initialize neuron 3's layer 3 with axon inputs from neuron id 0, neuron id 1 and neuron id 2 and the rest of the inputs are non-existent and take on default values of 0. In case a neuron's inputs come from a PNS input resource then the input name follows the PNS input naming convention for the input in question. For example, "axon_4_in_4={in1Name_0, 1'b0, 1'b0, 1'b0, 1'b0, 1'b0, 1'b0, 1'b0, 1'b0, 1'b0, 1'b0, 1'b0, 1'b0, 1'b0, 1'b0, 1'b0};" would indicate that neuron id 4's layer 4 has a single input from PNS input "in1Name_0". Finally, 322 invokes 31205 Create Finish to add the text "end" followed by the text "endmodule" and that completes 7.

FIG. 10 illustrates detail of 10 Nervous System HDL Runtime Modules. These are the two runtime modules recovered from patent application Ser. No. 15/660,858 which have been converted into HDL from JAVA. There are three significant changes required for 210 Neuron and 220 Astrocyte, from their patent application Ser. No. 15/660,858 counterparts. First are modifications from the heavy use of floating-point arithmetic in Ser. No. 15/660,858 to the use of fixed-point arithmetic in 1 Nervous System on a Chip. Floating-point arithmetic on FPGA and ASIC devices is problematic due to the necessity of a single floating-point processor unit (FPU) to be embedded on the devices. Some devices have FPUs but most don't. And even when they do it would require all 210 and 220 modules to access the same FPU, which would eliminate the massive parallel nature of 1. Consequently, each 210 and 220 module instantiated has its own self-contained fixed-point arithmetic processing and thus massive parallelism can be obtained and results in a more biologically realistic system. There are many examples of fixed-point arithmetic that can be implemented on FPGA or ASIC devices but none of them match what is required for 210 and 220 in optimum form. The routines used here are unique in that they have been optimized for 1. This means that the entire range of input and output values for each calculation in each module have been determined a-priori and the routines have been optimized around this knowledge. As well, the code that calls these fixed-point routines presets the inputs to the same alignment of the decimal point regardless of whether the inputs are 16 or 32 bits or a combination. There are no 64 bit inputs. Also, the calling code sets bit 31 of both inputs to the sign bit; either 0 for positive valued or 1 for negative valued. Also, all the arithmetic routines setup temporary results registers and then in the final step of the routine the temporary result is set to the output variable's result. This prevents the calling code from receiving incomplete results. Finally, all the calling code has been setup to avoid the possibility of overflows, so no overflow bit is returned to the calling code. The first fixed-point routine implemented within both 210 and 220 is fixed-point addition, which is displayed in FIG. 10 as Fixed-Point Add (FPA). FPA checks the sign bits for equivalence. If equivalent then addition using an HDL "+" operator is performed and the results are placed in an output register. The sign bit of the output is set to the first input. If the sign bits are not the same then subtraction is performed using the "−" HDL operator by subtracting the smallest absolute value quantity from the largest. Then the sign bit is set according to 4 possible conditions: if the first input is positive and greater in absolute value then the result sign bit is positive; if the first input's sign bit is positive and the absolute value is smaller then the result sign bit is negative; if the second input is negative and is smaller in absolute value then the output sign bit is positive; if the second input is negative and greater in absolute value then the output sign bit is negative. The second fixed-point routine implemented within both 210 and 220 is fixed-point multiplication, which is displayed in FIG. 10 as Fixed-Point Multiply (FPM). FPM sets up a temporary 64 bit result register to store the initial result of multiplying two 31 bit registers together. Then the multiplicand and multiplier inputs, without the sign bits, are multiplied together using the HDL "*" operator. The sign bit of the result is set to the logical 'or' of the two inputs using the HDL "^" operator. Finally, the temporary results are loaded into the FPM's return variable. The final fixed-point arithmetic routine is Fixed-Point Division (FPD). This routine is only used twice in the neuron module; is not used at all in the astrocyte module. The runtime modules have been optimized to avoid division since its usage is costly in HDL synthesized form. As such, FPD emulates division and never uses the HDL "/" operator. First, the sign bit of the temporary quotient is set by performing a logical OR between the input divisor's and input dividend's sign bits. Then a loop counter is established equal to the results of: 32+decimal point−1. During each loop the divisor is divided by 2 which is to say it is right-shifted by 1, i.e. ">>1". Then 1 is subtracted from the loop counter. Next, a check is done to see if the dividend is greater than or equal to the divisor, i.e. are we working on integer values or decimal values for the temporary quotient at this point in the division. If still working on integer values then we subtract the divisor from the dividend and assign the result to the dividend. Also, we set the bit of the temporary quotient pointed to by the loop counter to 1, i.e. =1'b1. Now, if the loop counter equals 0 then it is time to stop. At this point the temporary quotient is loaded into the FPD output quotient, the remainder is loaded into the output quotient post decimal point and the FPD output quotient's sign bit is loaded from the temporary quotient sign bit. The second set of modifications necessary for the run-time routines is the use of HDL module ports for both 210 and 220 and the additional use of HDL module parameters for 210. The ports and parameters for the instantiated versions of 210 and 220 were detailed in FIG. 5, FIG. 6 and repeated in FIG. 8 and FIG. 9. The third modification required for 210 and 220 and massive parallelism of 1 is that in Ser. No. 15/660,858 there is a central module which scans through every neuron and astrocyte module for each time step and gives each such module an opportunity to update themselves. In 1 there is no requirement for such a central module required to activate each 210 and each 220 because each module operates independently all the time and any change to any module's input ports is enough to activate it; otherwise the module and its circuits are silent, which ultimately conserves power resources and is again more biologically realistic.

Advantages

The ability to place nervous system models striving for neurophysiologically realism onto microchip hardware devices such as field programmable gate arrays (FPGAs) or application-specific integrated circuits (ASICs) has significant advantages over older technology, which place nervous system models onto either general purpose computing devices employing central processing units (CPUs), which are sequential in nature, or even those that use CPUs but additionally employ graphic processing units (GPUs) for a partial boost in parallelism. First of all, in real nervous systems all the neurological entities, including neurons, astrocytes and their processes, operate in parallel which is impossible for CPU or CPU devices assisted by GPUs to reproduce at the scale of millions of neurons and astrocytes. The method presented here, however, operates every neuron and every astrocyte in parallel in hardware thus alleviating the older technology's key hindrance—lack of parallelism. A further advantage of this method includes timing control of the exact frequencies of operation including frequencies less than or greater than biological systems. This flexibility gives the user complete control of the relative timing characteristics of the resultant model. Finally, Nervous System on a Chip achieves neuromorphic computing on economical FPGA hardware at an extensible scale, which has applicability to many important leading edge fields: for corporate and personal use the resultant hardware can be integrated together under the Internet of Things (IOT) umbrella into arrays of integrated processes supporting both home and factory automation. This integration of disparate processes is performed naturally by biological systems and is a resultant advantage of The Nervous System Modeling Tool: when placed into hardware nervous systems support the inclusion of many disparate processes together, e.g. TVs, lighting, heating, refrigerators, sound systems, etc. For Big Data Analysis the resultant hardware can be used as accelerators for significantly faster data analysis processing. As well, the analyses can be integrated across disparate domains such as vision and hearing data. For robots, the ability to have a centralized control system supported by peripheral processes all of which are operating at microchip speeds as well as being integrated together under the same architecture has significant advantages similar to those performed naturally by biological systems. Given that biological systems can display intelligence and given that the Nervous System Modeling Tool can reproduce nervous systems and given that the Nervous System on a Chip can operate or surpass biological operating speeds then the following artificial intelligence pursuits are tenable by Nervous System on a Chip: language processing and understanding, planning, analysis with incomplete information, interpretation of emotions, self-learning and autonomous behavior.

What is claimed is:

1. A method of simulating a nervous system on a solid state storage medium, comprising:
  receiving the input from a Constructs Nervous System process by a Nervous System to Hardware Description Language (HDL) Translator;
  translating the input into HDL code for an instantiated neuron and astrocyte modules' parameters in a High-Level Module HDL by the Nervous System to HDL Translator;
  compiling the HDL code by either a Create Output for Simulation process or by a Create Output for Hardware process; and
  translating Nervous System HDL Runtime Modules into HDL modules comprising astrocyte and neuron runtime routines.

2. The method of claim 1, wherein the Nervous System to HDL Translator is configured to:
  filter neurons and astrocytes databases for dynamic values; and
  pass filtered values into either of a Build for Simulation module or Build for Hardware module.

3. The method of claim 2, wherein the Build for Simulation module comprises:
  a Build for Simulation I process; and
  a Build for Simulation II process.

4. The method of claim 3, wherein the Build for Simulation I process comprises:
  a Create Simulation Header, comprising generating a timescale compiler directive to set a clocking frequency and timing resolution;
  processing Simulation PNS I, comprising reading all filtered Neurons;
  processing axon inputs and outputs;
  processing astrocytes inputs and outputs; and an Instantiate Astrocytes process, comprising constructing instantiated astrocyte modules within the Build for Simulation module.

5. The method of claim 3, wherein the Build for Simulation II process comprises:
   an Instantiate Neurons process, comprising constructing instantiated neuron modules within the Build for Simulation module for every neuron;
   a Create Simulation Begin process;
   a Process Simulation PNS II, comprising initializing PNS inputs and outputs to a default value;
   a Process Axons Initialization, comprising initializing layers of axon inputs per layer; and
   a Create Finish process.

6. The method of claim 2, wherein the Build for Hardware module comprises:
   a Build for Hardware I process; and
   a Build for Hardware II process.

7. The method of claim 6, wherein the Build for Hardware I process comprises:
   a Create Hardware Header, comprising generating a timescale compiler directive to set a clocking frequency and timing resolution;
   processing Hardware PNS I, comprising reading all filtered Neurons;
   processing axon inputs and outputs;
   processing astrocytes inputs and outputs; and
   an Instantiate Astrocytes process, comprising constructing instantiated astrocyte modules within the Build for Hardware module.

8. The method of claim 6, wherein the Build for Hardware II process comprises:
   an Instantiate Neurons process, comprising constructing instantiated neuron modules within the Build for Hardware module for every neuron;
   a Create Hardware Begin process;
   a Process Axons Initialization, comprising initializing layers of axon inputs per layer; and
   a Create Finish process.

* * * * *